Patented May 22, 1934

1,959,343

UNITED STATES PATENT OFFICE 1,959,343

POLYMERIZATION OF UNSATURATED HYDROCARBONS AND RESULTING PRODUCTS

William S. Calcott, Penns Grove, N. J., Albert S. Carter, Wilmington, Del., and Frederick B. Downing, Carneys Point, N. J., assignors to E. I. du Pont de Nemours & Company, Wilmington, Del., a corporation of Delaware No Drawing. Application April 23, 1930, Serial No. 446,790

28 Claims. (Cl. 260—2)

This invention relates to the polymerization of unsaturated hydrocarbons and, more particularly, to the polymerization of partially hydrogenated unsaturated polymers of acetylene.

*Prior art*

It is known that by passing acetylene into a mixture of ammonium chloride, water, cuprous chloride and copper powder of suitable proportions and under proper conditions, unsaturated hydrocarbons of higher molecular weight are formed. These hydrocarbons may be separated by distillation from the reaction mixture. The product is a low-boiling (80-85° C.) highly unsaturated liquid. This liquid is apparently made up of a number of constituents, apparently having the general formula $C_xH_x$. The major constituent is called divinylacetylene and most probably has the empirical formula $C_6H_6$. Others formed in appreciable proportions, which may be mentioned, are believed to have the formulæ $C_8H_8$ and $C_4H_4$. These products in turn may be roughly separated by distillation.

It is also known that the crude mixture, any one of its constituents or mixtures of the various constituents may be polymerized in various ways, for instance, by aging at ordinary temperatures. The polymerization is greatly accelerated at elevated temperatures, and is known to take place either in the presence of oxygen or inert gases, as nitrogen. In the presence of oxygen, the polymerizing material will absorb oxygen with the development of compounds having explosive properties. Therefore, if it is desired to carry out the polymerization in an oxygen environment and at the same time produce a material free from chemically combined oxygen some method for inhibiting oxidation must be employed. One successful method already disclosed is to incorporate into the material to be polymerized a substance which will prevent oxygen absorption.

As the polymerization proceeds regardless of the method employed, the material passes successively to an oily, then to a gelatinous, then to a resinous mass, and finally yields a hard, brittle resinous material having unusual resistance to the action of water and to organic solvents. The oily product which is first formed in largely soluble in alcohol and acetone; the gelatinous body next formed is largely soluble in acetone but only partially soluble in alcohol; the resinous modification is substantially insoluble in alcohol and is to a slight extent soluble in acetone; the final, hard, brittle polymers are substantially insoluble in both alcohol and acetone. These successive polymerization products apparently consist of a group of compounds in various stages of polymerization and they may be only roughly separated by dissolving. They may be successfully separated by distillation.

If the polymerization is stopped in the initial stages, the oily liquid polymer obtained may be separated from the volatile unpolymerized material by distillation. The resultant residue is a non-volatile substance having the general properties of a bodied drying oil. It has been shown that this drying oil may be used in the manufacture of paints or other coating compositions. It may be mixed with the solvents, pigments, fillers, etc., commonly employed in the preparation of coating compositions.

The example following illustrates the preparation from acetylene of the polymerizable polymer by the known method referred to above.

*Example A*

945 parts by weight of ammonium chloride, 1000 parts by weight of water, 2850 parts by weight of cuprous chloride, and 100 parts by weight of copper powder, are mixed and this mixture thoroughly agitated while passing into it acetylene gas. When the reaction slows up, as shown by a decrease in the rate of absorption of acetylene, the operation is discontinued, and the highly unsaturated hydrocarbon product formed is obtained by distillation, which is stopped when the condensed hydrocarbon is mixed with much water. The water is separated and returned to the reaction mass which, after cooling, is ready for the absorption of more acetylene. It is preferable, although not essential, to keep the reaction temperature at approximately 25° C. by suitable cooling of the reaction mass. As already stated, the resultant material contains a number of polymers the most abundant of which is believed to be divinylacetylene and to have the formula

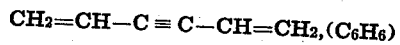
$CH_2=CH-C\equiv C-CH=CH_2, (C_6H_6)$

Other polymers produced in appreciable quantities are believed to have the formulæ: $C_8H_8$ and $C_4H_4$. These products may be separated by distillation.

As illustrative of the partial polymerization by a known method of the material obtained in Example A, the following example is furnished.

*Example B*

1000 grams of pure divinylacetylene obtained from the product of Example A by distillation is boiled at atmospheric pressure and in the presence of air for four hours in a vessel provided with a condenser for the return of the condensed vapors to the reaction. The temperature of the boiling liquid is between 89° and 90° C. At the end of four hours the unchanged divinylacetylene is distilled off under reduced pressure. There remains, in 12 to 18% yield, a viscous nonvolatile residue having the general properties of a bodied drying oil and consisting of the polymerized divinylacetylene.

Owing to their high degree of unsaturation, the characteristic behavior of the polymerizable acetylene polymers, as prepared by the methods described above, is to rapidly absorb oxygen and also to undergo further polymerization. It has been found that, by hydrogenating the unsaturated acetylene polymers described above, compounds are produced which show a decreased tendency to polymerize and absorb oxygen chlorine and bromine. All of the acetylene polymers described above, whether or not they are partially polymerized, as has been shown in the copending application hereinafter identified, will react with hydrogen under suitable conditions, with the possible exception of the substantially completely polymerized hard brittle solid polymer. The less highly polymerized solid polymers of the semiplastic type, however, react normally.

The product of this hydrogenation is a mixture of saturated and unsaturated hydrocarbons, the average molecular weight of which is dependent upon the particular acetylene polymers started with and the percentage composition is dependent upon the catalyst, the temperature and pressure, and the quantity of hydrogen added. Thus, if one starts with the acetylene polymer thought to be divinylacetylene, $C_6H_6$, the reduced products will contain some or all of the following; hexane, hexene, hexadiene, hexatriene, ethylvinylacetylene and diethylacetylene; if the starting material to be the tetramer of acetylene, $C_8H_8$, the products will contain octane and a series of unsaturated hydrocarbons of eight carbon atoms. In each of these cases, however, the relative quantities of the constituent products is determined by the catalyst, temperature, pressure, and quantity of hydrogen absorbed.

As illustrative of the hydrogenation by a known method of the described acetylene polymers, the following example is furnished.

Example C 100 parts of the acetylene polymer thought to be divinylacetylene are dissolved in an equal volume of acetone and 5 parts of a reduced nickel catalyst supported on kieselguhr and containing about 40% nickel are added. This catalyst may be prepared by precipitating nickel hydroxide on kieselguhr and igniting in an atmosphere of hydrogen by well known methods. The mixture is placed under 2 to 10 atmospheres of hydrogen pressure and heated to 70–100° C. with violent agitation. When 2.5 parts of hydrogen have been absorbed, the product is removed. It absorbs oxygen more slowly and is less unsaturated with respect to bromine absorption than the starting material. The product obtained by this partial hydrogenation contains practically no hexane or hexene but is believed to contain hexatriene (boiling 75–80° C.), hexadienes, ethylvinylacetylene and diethylacetylene together with some unreduced acetylene polymers. This mixture may be separated by known methods of fractionation or may be used directly. It and some of its constituent hydrocarbon members have been found to possess valuable application as resin forming materials, intermediates for the preparation of alcohols, glycols, halogen compounds and their derivatives.

The preparation of these hydrogenated compounds is disclosed in detail in the Calcott, Carter and Downing application filed March 24, 1930, Serial No. 438,658 now Patent 1,903,501.

It will be understood that any one of the unsaturated acetylene polymers described hereinabove or a mixture thereof may be hydrogenated similarly to the divinylacetylene of Example C and that the hydrogenation, instead of being discontinued at an intermediate stage as described in Example C, may be continued to any successive stage until an amount of hydrogen equivalent to 10% of the weight of the original polymer has been absorbed. Other suitable catalysts may be employed.

The above examples, it will be understood, merely illustrate the preparation of the already known materials and are not a part of the present invention.

Object of invention

As already stated, the original unsaturated polymerizable polymers, obtained from acetylene, show a tendency to change color upon exposure to light which is objectionable for certain uses. It is therefore the primary object of the present invention to produce polymerized products which are non-volatile film-forming materials similar in their general properties to the polymerized acetylene polymers obtained from acetylene as described above but which, in addition to being more stable and slower to absorb oxygen are less sensitive to light.

Description of invention

With these objects in mind, it has been discovered that all of the unsaturated products described above, i. e. those compounds having less hydrogen than indicated by the formula $C_nH_{2n+2}$, whether in the form of the original crude mixture, or whether separated, may in turn be polymerized with or without catalysts, preferably with the aid of heat to produce other products of higher molecular weight. The acetylene polymers may be reduced to any desired degree of saturation less than that represented by the formula $C_nH_{2n+2}$ and then polymerized, but we prefer to use the crude acetylene polymers which have been hydrogenated until only 2.2 to 2.6% of the original weight of the polymer has been absorbed as added hydrogen, giving an approximate average formula of $(C_2H_{2.7})_x$. We have found that we may polymerize this crude mixture of unsaturated compounds or any constituent fraction, obtaining products which are similar in their general properties.

All of the reduced acetylene polymers do not polymerize in exactly the same manner but the basic reaction of polymerization is common to all of those which are still unsaturated. Even those members which are hydrogenated to a degree of saturation as high as hexene undergo partial polymerization under extreme conditions.

We have further found that reduced acetylene polymers may be polymerized not only as individual compounds but also as mixtures with other reduced acetylene polymers, unreduced acetylene polymers, or other polymerizable materials. Unpolymerizable materials may be present either as inerts, which generally slow down the reaction owing to dilution, or as catalysts to speed up the reaction as will be described below. Acetylene polymers may be partially reduced, as described in the copending case, identified hereinabove, to a composition containing unreduced acetylene polymers in addition to the reduced members. Upon polymerization of this mixture, the product contains polymers of both reduced and unreduced material and in addition it is thought to contain cross-polymers formed by combination of reduced material with unreduced material.

In like manner, such polymerizable materials as the following may be added to and polymerized with these reduced acetylene polymers; butadiene, isoprene, dimethylbutadiene, China-wood oil, styrene, furylethylene, mixtures of phthalic anhydride and polyhydric alcohols, phenol formaldehyde condensation mixtures, and other polymerizable substances. It is not essential to the invention that cross polymerization take place, but evidence that it does is found in the fact that greater compatibility is obtained in this manner than by polymerizing the material individually and subsequently mixing. Further, we have found, in support of the idea that interaction takes place between the polymerizable constituents of these mixtures, that the rate of the reaction is greater than would be expected from calculations based on the known rates for the constituents alone, taking into consideration the retarding effect caused by dilution.

In order to illustrate the invention the following examples are furnished. It will be understood that the conditions specifically recited therein may be varied within wide limits and that such variations while they may result in different results are nevertheless within the scope of the invention provided polymerization is effected.

Example I

Reduced acetylene polymers obtained by adding 2 parts of hydrogen to 78 parts of crude acetylene polymers, (obtained according to Example A, prior art), in the presence of nickel at 85° C. and 150 pounds of hydrogen pressure, is heated to boiling in an atmosphere of nitrogen and maintained at that temperature for five hours, returning the condensed vapor to the reaction by means of an efficient reflux condenser. At the end of this period, the unchanged material is distilled off, leaving approximately 10-20% of viscous non-volatile oil having the general properties of the polymerized acetylene polymers described by Nieuwland and Calcott and Downing, but lighter in color, somewhat slower to absorb oxygen and less sensitive to light.

Example II

The reduced acetylene polymers described in Example I are carefully fractionated and the portion boiling between 72 and 76° C. is heated under its own vapor in a closed bomb at 120 to 150° C. for 3 hours. At the end of this time the unpolymerized material is removed by distillation leaving a residue equal to approximately 20% of the original material, which is practically colorless, very stable toward either visible or ultra-violet light and which rapidly absorbs halogens or oxygen.

Example III

Crude acetylene polymers prepared as illustrated in Example A (prior art) are reduced, as illustrated in Example C (prior art) at 85° C. in an equal volume of acetone with hydrogen at 10 atmospheres pressure in the presence of nickel until hydrogen equal to 2.5% of the original weight has been added. The product is violently boiled under a reflux distilling column which returns all material boiling over 70° to the reaction flask and allows acetone and other low boiling constituents to escape. When distillation ceases, 1% of benzoyl peroxide is added to the residue and heating continued at 70-90° for two hours. At the end of this time 20% of benzene is added and the product distilled under reduced pressure to obtain a residue of polymerized hydrocarbon of any desired percentage composition in solution in the added solvent.

The polymerization may be continued after the addition of the solvent, if desired, giving a higher yield of polymer without as great danger of gel formation. It is preferred to add the solvent after partial polymerization has been accomplished, for the rate of reaction is greatly slowed down when a solvent is present. The product obtained in this manner is a solution of a yellow oil, which upon removal of the solvent, is a viscous liquid, highly unsaturated, and possessing the properties of a drying oil in so far as oxygen absorption and film formation are concerned. It possesses greater stability to light than does polymerized, unreduced acetylene polymers.

Example IV

The fraction of reduced acetylene polymers described in Example II is added to an equal volume of the polymer obtained by distillation from the product of Example A and thought to be divinylacetylene, and the mixture polymerized in the manner described in Example I. The product is essentially the same, though not identical, in its behavior to that described in Examples I and III.

Example V

The reduced acetylene polymer fraction described in Example II is heated in a closed system at 100-180° C. under nitrogen with 1% of benzoyl peroxide, sodium perborate or percarbonate. After several hours heating (approximately four hours) the material forms a light colored gel which upon continued heating becomes hard and brittle ultimately giving at the end of approximately 24 hours, an extremely hard, brittle straw colored, resin with high gloss and no apparent solubility in any known solvent other than those, such as fuming nitric acid, which may cause solution of part of the materials by first oxidizing it.

Example VI

Crude reduced acetylene polymers obtained by adding 3 parts of hydrogen to 78 parts of crude acetylene polymers, obtained as described in Example A, is slowly added to concentrated sulfuric acid at 0° C. Violent reaction results with the evolution of considerable heat which must be removed continuously, at the same time agitating the mixture to obtain contact of the acid and reduced acetylene product. When a quantity of reduced material equal to the weight of the sulfuric acid has been added, agitation is continued for one hour while the product is allowed to slowly warm up to 20-30° C. The product may be worked up in two ways: (1) separation may be allowed to take place and the polymer removed by filtration, or (2) water may be added followed by separation into two layers with subsequent evaporation of volatile material from the black polymer layer. In either case, a black, tarry polymer is obtained which is somewhat thermoplastic and slowly becomes hard and brittle upon continued heating or exposure to air. In addition to the polymer, a portion of the material reacts with the sulfuric acid forming sulfur containing esters which are in part converted into alcohols and glycols by treatment with water. Hexenyl alcohol has been isolated from this alcohol mixture.

Example VII

The crude acetylene polymer obtained as described in Example A (prior art) was polymerized by boiling at atmospheric pressure under nitrogen for 3 hours in a vessel provided with a condenser for return of the vapors to the reaction. At the end of this period, one part of the product is added to one part of acetone and the mixture hydrogenated as described in Example C until .025 parts of hydrogen have been absorbed. Acetone is removed from this mixture by washing with water, and it is next heated in an autoclave for three hours at 100° to bring about further polymerization, at which time, unchanged acetylene polymer and hydrogenated acetylene polymer is distilled off. There remains a thick viscous oil, similar in many respects to the product described in Example B (prior art), but somewhat less unsaturated with respect to bromine absorption and resembling the product of Example I with regard to light stability. This viscous oil may be further polymerized to a light brown brittle resin by heating in an atmosphere of nitrogen at 110° for 36 hours.

From these examples, it is clear that all of the reduced acetylene polymers do not polymerize in exactly the same manner, but the basic reaction of polymerization is common to all of them which are still unsaturated. Even those members which are hydrogenated to a degree of saturation as high as hexene undergo partial polymerization under extreme conditions.

Polymerization catalysts may or may not be used, as desired. As catalysts for these polymerizations, the following substances and groups of substances have been found to be effective: alkali metals such as lithium, sodium and potassium; alkaline earth metals such as calcium and barium; alloys of these metals with themselves or others, such as the eutectic of sodium and potassium; halides of certain metals such as aluminum chloride, zinc chloride, and calcium chloride; halides of certain non-metals and metalloids such as stannous and stannic chloride, antimony tri- and pentachloride, arsenic tri- and pentachloride, sulfur monochloride, titanium tetrachloride and boron fluoride; peroxides such as sodium peroxide, potassium peroxide, barium peroxide and benzoyl peroxide; percarbonates, perborates and certain other persalts; anhydrides such as acetic anhydride, maleic anhydride and phthalic anhydride; and certain acids such as sulfuric acid, chlorosulfonic acid and formic acid.

As the reduced products absorb oxygen, part of the apparent polymerization (as determined by the formation of non-volatile material) is due to oxygen absorption. To avoid excessive formations of non-volatile material, the polymerization is preferably carried out in the absence of air, for example, under nitrogen. In the presence of oxygen, the polymerization rate is more rapid and the tendency to become semi-solid or gel-like becomes greater; thus in an atmosphere of nitrogen the products may be stored for many months at room temperature, whereas in air, polymerization and oxidation will cause gelling at room temperatures in several days.

Polymerization is hastened by the application of heat and, in some cases where catalysts are involved, the nature of the product prepared by heating is not identical with that obtained in the cold. Temperatures between 25° and 200° C. have been found useful, though with those catalysts which cause violent polymerization, such as sulfuric acid and chlorsulfonic acid, a temperature of 0° or lower is advantageous. With catalysts and with benzoyl peroxide, sodium perborate, acetic and maleic anhydride, potassium percarbonate, barium peroxide, and many other catalysts, a temperature of 120° to 150° is preferred.

During the polymerization the average molecular weight of the product increases with a simultaneous increase in viscosity. Also, during this process the solubility of the product decreases and the boiling point increases with the resulting formation of less volatile material. In the case of the highly unsaturated reduced acetylene polymers, as the less volatile portion increases, first a portion of the product becomes insoluble in alcohol; thereafter the alcohol insoluble increases and a portion of it becomes insoluble in acetone but soluble in benzene; with continued heating, the acetone insoluble portion increases and a small amount of material is formed which is insoluble in benzene. Following the appearance of this benzene insoluble material, the entire mass becomes semi-solid then gels; at this point, 25–30% of the mass is non-volatile. If heating is continued, the gel becomes solid, forming a transparent brittle resin which becomes extremely hard as the heating is continued.

It is to be understood that this resin formation is limited to certain fractions of the reduced material, such as that boiling above 70° C., and that if crude reduced acetylene polymers are used as the starting material, these differences in polymerization behavior may result in a heterogeneous product, for a portion of the hydrocarbon may be unpolymerized when a part of it has reached the solid insoluble stage. We therefore prefer to carefully separate the reduced acetylene polymers into individual compounds or mixtures of similar compounds and polymerize them as such. When this is done, the volatile material which is removed during the preparation of the viscous liquid polymer described, for example, in Example II, is identical with the original material and may be reused in subsequent polymerization.

If the process is interrupted at a point where the product is a liquid containing about 15–20% non-volatile, the unpolymerized material may be distilled off and repolymerized, leaving an oily residue which is liquid and 100% non-volatile. This new synthetic drying oil is still unsaturated and will absorb oxygen and halogens, the rapidity of oxygen and bromine absorption being greater the more unsaturated the original reduced acetylene polymer used for the polymerization.

The polymerization may or may not be carried out in solution as desired. The following solvents have been found valuable under various conditions of operation: acetic acid, methyl alcohol, ethyl alcohol, propyl alcohol, isopropyl alcohol, butyl alcohol, isobutyl alcohol, acetone, methyl acetate, ethyl acetate, propyl acetate, butyl acetate, methyl butyrate, ethyl butyrate, butyl butyrate, other esters of low molecular weight, solvent naphtha, benzene, toluene, xylene, tetrahydronaphthalene, decahydronaphthalene, cyclohexane, cyclohexanol, methylcyclohexane, pentane, hexane, heptane, octane, and other saturated hydrocarbons. The amount of solvent employed may be varied within wide limits. Since the presence of a solvent acts to slow down the polymerization, the rate of the reaction may be conveniently controlled by the addition of the solvent in appropriate quantities. When the polymerization is thus controlled, the danger of the formation of excessive quantities of the less desirable high polymers is greatly diminished.

It will be understood that the products resulting from the process herein described are mixtures of complex constitution and that it is impossible to state what is their exact chemical constitution. Although many of the supposed constituents are recorded in the literature, many also were heretofore unknown. The specific composition of these mixtures depends, of course, upon the particular raw materials and method employed in a given instance but whatever the method employed, the resulting mixtures possess in common valuable properties distinguishing them from known hydrocarbons or known mixtures of hydrocarbons. The preferred products obtained from the selected fraction boiling between 72° and 76° C. are derived from a hydrocarbon which itself has not been heretofore prepared.

These products all differ from the products obtainable from known hydrocarbons by polymerization chiefly in that they are very highly unsaturated and absorb oxygen in the manner of bodied drying oils. Thus they constitute a new class of synthetic drying oils suitable for compounding as paints and lacquers. After drying in the air, the films formed by these polymers are highly resistant to chemical action. In most respects the products are similar to those illustrated in Example B, but in addition they exhibit remarkable improvement in stability under exposure to light. These products are, therefore, new compositions of matter comprising known and unknown hydrocarbons in varying degrees of polymerization and in varying proportions.

We claim:

1. The process which comprises partially hydrogenating a polymerizable nonbenzenoid polymer of acetylene and polymerizing the resulting product.

2. The process which comprises partially hydrogenating a polymerizable nonbenzenoid polymer of acetylene and heating the resulting product to between 25° and 200° C. to effect polymerization.

3. The process which comprises partially hydrogenating a polymerizable nonbenzenoid polymer of acetylene and heating the resulting product under nonoxidizing conditions to effect polymerization.

4. The process which comprises partially hydrogenating a polymerizable nonbenzenoid polymer of acetylene and heating the resulting product in the absence of air and in the presence of a polymerization catalyst to effect polymerization.

5. The process which comprises partially hydrogenating a polymerizable nonbenzenoid polymer of acetylene, dissolving the resulting product in an inert solvent and heating the solution to effect polymerization.

6. The process which comprises hydrogenating a nonbenzenoid polymerizable polymer of acetylene until up to 10% of hydrogen based on the original weight of the acetylene polymer has been absorbed and polymerizing the resulting product.

7. The process which comprises partially hydrogenating a polymerization product of acetylene, said product containing divinlyacetylene and heating the reduced product to effect polymerization.

8. The process which comprises partially hydrogenating a polymerization product of acetylene, said product containing divinylacetylene and heating the reduced product in the absence of air to effect polymerization.

9. The process which comprises partially hydrogenating a polymerization product of acetylene, said product containing divinylacetylene and polymerizing the reduced product in the presence of a solvent.

10. The process which comprises partially hydrogenating a polymerization product of acetylene, said product comprising divinylacetylene and polymerizing the reduced product in the presence of a polymerization catalyst.

11. The process which comprises combining from 2.2 to 2.6 parts of hydrogen with 100 parts of a polymerization product of acetylene, said product containing divinylacetylene and heating the reduced product to a temperature between 25° and 200° C. to effect polymerization.

12. The process which comprises combining from 2.2 to 2.6 parts of hydrogen with 100 parts of a polymerization product of acetylene, said product containing divinylacetylene and heating the reduced product under non-oxidizing conditions to a temperature between 120° and 150° C. to effect polymerization.

13. The process which comprises combining from 2.2 to 2.6 parts of hydrogen with 100 parts of a polymerization product of acetylene, said product containing divinylacetylene and heating the reduced product in its own vapor to a temperature between 120° to 150° C. for about 3 hours to effect polymerization.

14. The process which comprises combining from 2.2 to 2.6 parts of hydrogen with 100 parts of a polymerization product of acetylene, said product containing divinylacetylene, heating the reduced product in its own vapor to a temperature between 120° to 150° C. for about 3 hours to effect polymerization, and removing the unpolymerized material by distillation.

15. The process which comprises partially hydrogenating a polymerization product of acetylene, said product containing divinylacetylene, separating that portion of the hydrogenated product boiling between 72 and 76° C. and heating the separated product in its own vapor to a temperature between 120° to 150° C. for about 3 hours to effect polymerization.

16. The process which comprises combining from 2.2 to 2.6 parts of hydrogen with 100 parts of a polymerization product of acetylene, said product containing divinylacetylene, removing the material boiling below 70° C., heating the residue to effect partial polymerization, adding a solvent to the partially polymerized product, and removing the unpolymerized material by distillation to obtain a viscous, highly unsaturated oil.

17. The process which comprises partially hydrogenating a polymerizable acetylene polymer, adding a polymerizable unsaturated hydrocarbon, and heating the resulting mixture to effect polymerization.

18. The process which comprises combining 2 parts of hydrogen with substantially 78 parts of a polymerization product of acetylene, said product containing divinylacetylene, separating that portion of the hydrogenated product boiling between 72 and 76° C., adding thereto an equal volume of divinylacetylene and heating the mixture in its own vapor to a temperature between 120° to 150° C. for about 3 hours to effect polymerization.

19. A mixture obtained by partially hydrogenating a polymerizable nonbenzenoid polymer of acetylene and polymerizing the resulting product.

20. A mixture obtained by partially hydrogenating a polymerizable nonbenzenoid polymer of acetylene and heating the resulting product to between 25°–200° C. to effect polymerization.

21. A mixture obtained by partially hydrogenating a polymerizable nonbenzenoid polymer of acetylene and heating the resulting product in the absence of air to effect polymerization.

22. A mixture obtained by partially hydrogenating a nonbenzenoid polymerizable polymer of acetylene until up to 10% of hydrogen based on the original weight of the acetylene polymer has been absorbed, polymerizing the resulting product and thereafter removing the unpolymerized material by distillation.

23. A mixture obtained by partially hydrogenating a polymerization product of acetylene, said product containing divinylacetylene and heating the reduced product to effect polymerization.

24. A mixture obtained by combining from 2.2 to 2.6 parts of hydrogen with 100 parts of a polymerization product of acetylene, said product containing divinylacetylene and heating the reduced product to a temperature between 120° and 150° C. to effect polymerization.

25. A colorless, light-stable mixture obtained by partially hydrogenating a polymerization product of acetylene, said product containing divinylacetylene, separating that portion of the hydrogenated product boiling above 70° C., heating the separated product in its own vapor to a temperature between 120° to 150° C. for about 3 hours to effect polymerization and removing the unpolymerized material by distillation.

26. A mixture obtained by partially hydrogenating a nonbenzenoid polymerizable acetylene polymer, adding a polymerizable unsaturated hydrocarbon, and heating the resulting mixture to effect polymerization.

27. A mixture obtained by combining 2 parts of hydrogen with substantially 78 parts of a polymerization product of acetylene, said product containing divinylacetylene, separating that portion of the hydrogenated product boiling between 72 and 76° C., adding an equal volume of divinylacetylene and heating the mixture in its own vapor to a temperature between 120° to 150° C. for about 3 hours to effect polymerization.

28. A viscous, highly unsaturated, light-stable oil obtained by combining from 2.2 to 2.6 parts of hydrogen with 100 parts of a polymerization product of acetylene, said product containing divinylacetylene removing the material boiling below 70° C., heating the residue to effect partial polymerization, adding a solvent to the partially polymerized product, and removing the unpolymerized material by distillation.

WILLIAM S. CALCOTT.
ALBERT S. CARTER.
FREDERICK B. DOWNING.